Feb. 3, 1931.   R. E. WILSON   1,791,020
APPARATUS FOR MEASURING THE TEMPERATURE OF GASES
Filed May 5, 1922
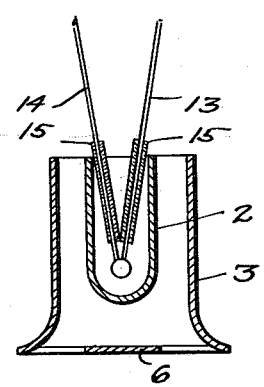
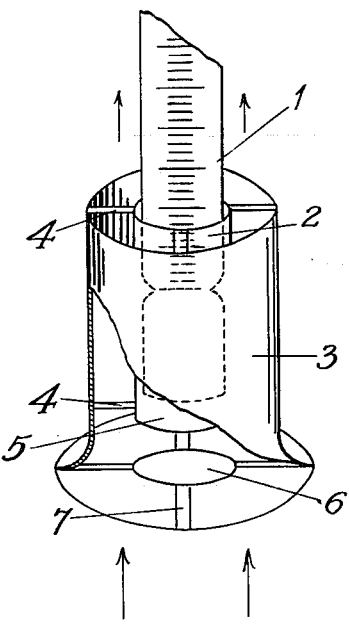
Robert E Wilson Inventor Patented Feb. 3, 1931

1,791,020

UNITED STATES PATENT OFFICE

ROBERT E. WILSON, OF CAMBRIDGE, MASSACHUSETTS

APPARATUS FOR MEASURING THE TEMPERATURE OF GASES

Application filed May 5, 1922. Serial No. 558,826.

This invention relates to an apparatus for measuring the true temperature of gases in places where the surroundings or bounding surfaces are of different temperature from the gases.

When ordinary thermometers are placed in a gas stream, such as in a flue or the exhaust pipe of an engine, where the gases are much hotter than the surrounding walls, the thermometer being a solid, continually radiates heat to the surrounding walls, and the temperature of the thermometer automatically adjusts itself so that heat flows from the gas to the thermometer just as fast as it is radiated from the thermometer to the walls. In order for this heat to flow from the gas to the thermometer, the thermometer must obviously be at a lower temperature than the gas, the magnitude of the difference depending upon the net amount of radiation, which in turn depends upon the difference in temperature between the thermometer and the walls and also upon the absolute temperature, since radiation effects increase as the fourth power of the absolute temperature. Only the net radiation effects need be considered in this connection, and such radiation effects between surfaces as counterbalance one another, will be disregarded in the illustration of my invention.

These difficulties in measuring gas temperatures can be partially avoided by covering the bulb of the thermometer with highly polished metal of low coefficient of radiation, such as silver, which radiates only a very small percentage as much heat as does glass or most other metals, and the thermometer would, therefore, drop only slightly below the temperature of the gas. Although the silver shield is satisfactory for some purposes, it loses this special advantage over other materials when employed in the presence of corrosive substances, such as the sulfur compounds which are almost invariably present in combustion gases whose temperature it is frequently desired to measure. Under such conditions, the silver becomes rapidly tarnished and this produces an enormous increase in its coefficient of radiation and it becomes practically impossible to measure, even approximately, the true temperature of the gas.

Other metals which would tarnish less readily, such as platinum or monel metal, have coefficients of radiation well below those of glass or tarnished silver, but not low enough to make them satisfactory for use in this way.

I have discovered that by using a plurality of radiation shields of non-tarnishing material, for example, two shields of polished metal disposed within one another and with gas passages between the shields, that extremely close and substantially correct readings may be obtained. The shields may be constructed of non-tarnishing metal, preferably of a substance which has a reasonably low coefficient of radiation, such as platinum or monel metal, and a temperature indicator such as a thermometer or thermocouple is placed within the innermost shield.

The following effect is obtained:

The outer metal shield approaches more closely to the true gas temperature than would a single thermal element made of the same metal, because gas is blowing past both inside and outside surfaces and hence heat can flow into it from both sides while it is radiating from only one side. For example, if the walls of a flue were at 200° F. and the gas at 400° F., such a metal shield would probably reach a temperature of about 380° F., the exact temperature depending upon the velocity of the gas and the radiating qualities of the material used. The inner metal shield, which surrounds the thermometer bulb and determines its temperature, now, however, instead of radiating to the walls of the flue at 200° F., radiates to the outer shield at a temperature of about 380° F. The temperature of this outer shield is so near the temperature of the gas that the inner shield, also receiving its quota of heat from the stream of gas, will usually register within two or three degrees of the true gas temperature. The outer shield should, as far as possible, prevent all direct radiation to the walls but permit free passage of gas between the shields.

Where thermocouples employing rare metals of reasonably low coefficient of radiation, such as platinum, are used, the inner shield may be dispensed with generally and only the outer shield employed, but provision for gas passage is still essential.

The accompanying drawings illustrate some specific embodiments of my invention.

Fig. 1 is a perspective view of a device for use when the thermometer or temperature indicator is inserted parallel to the flow of air or gas, parts of the device being broken away to show the interior thereof.

Fig. 2 is a cross-section of a modified form of my device, showing the use of a thermocouple.

Referring to Fig. 1, the apparatus comprises a thermometer (1), the bulb of which is surrounded by an inner shield (2) of metal, which in turn is surrounded by the outer metal shield (3), and is supported within the latter by supporting wires (4). The space between the inner and outer shields affords a passage for the air or gas whose temperature is to be measured, and whose path is indicated by the arrows. Suitably spaced from the end portion (5) of the inner shield (2) is the auxiliary shield (6), supported by the wires (7), which serves to minimize heat radiation effects in all directions.

In the modification shown in Fig. 2, a thermocouple comprising the two elements 13 and 14 having the insulation 15 is inserted within the inner shield 2 which is also surrounded by the outer shield 3, to which is attached the auxiliary shield 6.

My invention is not limited to the particular shape of the shields shown in the drawings, and altho cylindrical shields, such as shown, may be preferable under many conditions, shields of other configurations may be substituted without departing from the spirit and scope of my invention.

In the claims, the expression "surrounding" is intended to cover not only shields which form a continuous, solid wall or surface but also where the wall or surface is discontinuous at certain portions, provided that such shield is suitable for cutting off radiation in all directions.

The foregoing examples and their specific details are intended as illustrations and not as limitations of my invention because it is obvious that numerous modifications may be made therein without departing from the spirit and scope of the invention and it is desired that only such limitations be imposed as are indicated in the appended claims.

I claim:

1. Means for reducing heat radiation effects upon a temperature indicator comprising a plurality of polished, metallic shields of unequal size, adapted to surround the indicator at unequal distances from said indicator, said shields being disposed within one another and forming a conduit in direct communication with the outside of the outer shield and the outer shield being disposed to admit both sides thereof to be bathed in gas of the same temperature when the device is inserted in a gas stream, and means for protecting the portion of the temperature indicator most sensitive to temperature changes from direct radiation to any outside surface through the end of the outer shield.

2. In a temperature measuring device, a temperature indicator, means for reducing heat radiation effects upon said indicator comprising a plurality of polished, non-tarnishing, metallic shields substantially coaxial with and surrounding said indicator, said shields being spaced at unequal distances from said indicator and disposed within one another and forming a conduit in direct communication at each end with the outside of the outer shield and the outer shield being disposed to admit both sides thereof to be bathed in gas of the same temperature when the device is inserted in a gas stream, and means for protecting the portion of the temperature indicator most sensitive to temperature changes from direct radiation to any outside surface through the end of the outer shield.

3. Means for reducing heat radiation effects upon a temperature indicator comprising a small, polished, metallic, non-tarnishing shield adapted to closely surround the indicator and a larger, polished, metallic, non-tarnishing shield at a substantial distance from and surrounding said small shield, said shields forming a conduit in direct communication with the outside of the outer shield and the outer shield being disposed to admit both sides thereof to be bathed in gas of the same temperature when the device is inserted in a gas stream, and means for protecting the portion of the temperature indicator most sensitive to temperature changes from direct radiation to any outside surface through the end of the outer shield.

4. Means for reducing heat radiation effects upon a temperature indicator comprising a small, monel metal shield adapted to closely surround the indicator and a larger, monel metal shield at a substantial distance from and surrounding said small shield, said shields forming a conduit in direct communication at each end with the outside of the outer shield and the outer shield being disposed to admit both sides thereof to be bathed in gas of the same temperature when the device is inserted in a gas stream, and means for protecting the portion of the temperature indicator most sensitive to temperature changes from direct radiation to any outside surface through the end of the outer shield.

5. Means for reducing heat radiation effects upon a temperature indicator comprising a multiple shield of polished, non-tarnishing metal of low coefficient of radiation and having gas passages between the individual members of said shield in direct communication with the outside of the outer shield, the inner shield being adapted to receive the indicator and the outer shield being disposed to admit both sides thereof to be bathed in gas of the same temperature when the device is inserted in a gas stream, and means for protecting the portion of the temperature indicator most sensitive to temperature changes from direct radiation to any outside surface through the end of the outer shield.

6. Means for reducing heat radiation effects upon a temperature indicator comprising a multiple shield of polished, non-tarnishing metal of low coefficient of radiation and having gas passages between the individual members of said shield in direct communication with the outside of the outer shield, the inner shield being adapted to receive the indicator and the outer shield being disposed so as to shut off substantially all direct radiation from said inner shield to the walls of a body within which said device may be placed and to admit both sides of the outer shield to be bathed in gas of the same temperature when the device is inserted in a gas stream, and means for protecting the portion of the temperature indicator most sensitive to temperature changes from direct radiation to any outside surface through the end of the outer shield.

7. Means for reducing heat radiation effects upon a temperature indicator comprising a double shield of polished, monel metal and having a gas passage between the inner and outer members of said shield in direct communication at each end with the outside of said outer shield, the inner shield being adapted to receive the indicator and the outer shield being disposed so as to shut off substantially all direct radiation from said inner shield to the walls of a body within which said device may be placed and to admit both sides of the outer shield to be bathed in gas of the same temperature when the device is inserted in a gas stream, and means for protecting the portion of the temperature indicator most sensitive to temperature changes from direct radiation to any outside surface through the end of the outer shield.

8. In a temperature measuring device, a thermocouple of metal having low coefficient of radiation, means for reducing heat radiation effects upon said thermocouple comprising a non-tarnishing, metal shield of low coefficient of radiation, said shield being disposed to provide a gas passage between the shield and thermocouple in direct communication with the outside of said shield, to admit both sides of said shield to be bathed in gas of the same temperature when the device is inserted in a gas stream and to shut off substantially all direct radiation from said thermocouple to the walls of a body within which said device may be placed, and means for protecting the thermocouple from direct radiation to any outside surface through the end of the shield.

In testimony whereof I affix my signature.

ROBERT E. WILSON.